US010662505B2

(12) United States Patent
Botha et al.

(10) Patent No.: US 10,662,505 B2
(45) Date of Patent: May 26, 2020

(54) METHOD OF SEPARATING MERCURY FROM AN ORE LEACHATE

(71) Applicant: Ecolab USA Inc., St. Paul, MN (US)

(72) Inventors: Jan Botha, Johannesburg (ZA); Onur Toprak, Samsun (TR); Nicholas Ergang, Glen Ellyn, IL (US); Nikolas Zwaneveld, Glebe (AU); Daniel Child, Spring Creek, NV (US); Tolga Ercan, Istanbul (TR)

(73) Assignee: Ecolab USA Inc., St. Paul, MN (US)

( * ) Notice: Subject to any disclaimer, the term of this patent is extended or adjusted under 35 U.S.C. 154(b) by 0 days.

(21) Appl. No.: 15/597,451

(22) Filed: May 17, 2017

(65) Prior Publication Data

US 2017/0335429 A1    Nov. 23, 2017

Related U.S. Application Data

(60) Provisional application No. 62/339,300, filed on May 20, 2016.

(51) Int. Cl.
| | | |
|---|---|---|
| *C22B 43/00* | (2006.01) | |
| *C22B 3/44* | (2006.01) | |
| *C22B 3/20* | (2006.01) | |
| *C22B 11/08* | (2006.01) | |
| *B01D 21/01* | (2006.01) | |
| *C08L 79/02* | (2006.01) | |

(52) U.S. Cl.
CPC .............. *C22B 43/00* (2013.01); *B01D 21/01* (2013.01); *C08L 79/02* (2013.01); *C22B 3/20* (2013.01); *C22B 3/44* (2013.01); *C22B 11/08* (2013.01); *Y02P 10/234* (2015.11)

(58) Field of Classification Search
None
See application file for complete search history.

(56) References Cited

U.S. PATENT DOCUMENTS

| 3,873,581 | A   |   | 3/1975  | Fitzpatrick et al. |
|-----------|-----|---|---------|-------------------|
| 4,578,195 | A   | * | 3/1986  | Moore ............... C02F 1/285 |
|           |     |   |         | 210/679 |
| 4,678,584 | A   |   | 7/1987  | Elfine |
| 5,164,095 | A   |   | 11/1992 | Sparapany et al. |
| 5,599,515 | A   |   | 2/1997  | Misra et al. |
| 6,521,340 | B2  |   | 2/2003  | Rainer |
| 8,211,389 | B2  |   | 7/2012  | Zinn et al. |
| 8,282,835 | B2  |   | 10/2012 | Schwarz et al. |
| 2008/0283470 | A1 | * | 11/2008 | Gustafsson ............... C02F 1/24 |
|           |     |   |         | 210/674 |
| 2014/0061130 | A1 | * | 3/2014  | Musale ............. B01D 61/58 |
|           |     |   |         | 210/639 |
| 2014/0124452 | A1 | * | 5/2014  | Walterick, Jr. ......... C02F 1/5263 |
|           |     |   |         | 210/703 |

FOREIGN PATENT DOCUMENTS

| FR | 2156895 A1 | 6/1973 |
| WO | 2013025356 A2 | 2/2013 |

OTHER PUBLICATIONS

International Search Report for International Application No. PCT/US2017/033058, dated Jul. 7, 2017, 5 pages.
Written Opinion for International Application No. PCT/US2017/033058, dated Jul. 7, 2017, 8 pages.
Office Action in Chinese Application No. 201780030137.3, dated Nov. 8, 2019, 19 pages (11 pages English Translation and 8 pages Official Copy).

* cited by examiner

*Primary Examiner* — Melissa S Swain
(74) *Attorney, Agent, or Firm* — Kagan Binder, PLLC

(57) ABSTRACT

Described herein are compositions and methods for preferentially separating mercury from a metal product where both are present in an ore leachate. The separation is accomplished by adding a precipitating agent and a coagulant to an ore leachate followed by separating a mercury-laden precipitate therefrom to collect the treated leachate. The treated leachate includes about 0 to 50% by weight of the mercury and about 90% to 100% by weight of the metal product present in the ore leachate. In embodiments, the method further includes adding a flocculant to the ore leachate prior to the separating of the mercury-laden precipitate.

9 Claims, No Drawings

METHOD OF SEPARATING MERCURY FROM AN ORE LEACHATE

TECHNICAL FIELD

The process described herein relates to separation of mercury from ore leachates.

BACKGROUND

In metal product mining processes such as gold and silver mining processes, valuable metal is typically liberated from a metal product-bearing ore by leaching of the ore with a sodium cyanide solution at pH of about 9 or above. This process also causes the leaching of mercury into the solution as well where it interferes with the subsequent purification and processing of the metal product.

Mercury contamination in the Gold-Cyanide Process (GCP) is a serious health and environmental problem. Following the leaching with sodium cyanide at high pH, an ore leachate (also referred to as a cyanidation solution) containing dissolved metal-cyano species is collected and contacted with activated carbon in order to extract the gold from the solution. In Carbon Adsorption and Desorption processes, portions of the mercury-cyano complexes present in the ore leachate also readily adhere to the activated carbon and are thus carried forward as a contaminant into subsequent processing steps of electrowinning and carbon regeneration. In Merille-Crowe processing (Zinc precipitation) of gold, the mercury can be extracted from the precipitant by retorting under vacuum and high temperature, however this mercury will then need to be disposed of and risks exposure to workers. During these steps the contaminant mercury is often emitted into the air as a vapor. This poses a severe health hazard to plant workers and the local environment. Additional concerns relate to the safety of workers when handling the mercury contaminated materials and solutions.

The amount of mercury contamination present in an ore leachate varies depending on the particular ore. In some cases, mercury contamination is negligible. In other cases, as much as 50 ppm or even up to 100 ppm mercury is present in a cyanidation solution.

It would be highly desirable to remove some or all of the mercury present in a mercury-containing ore leachate while also substantially avoiding the removal of the metal product (e.g. gold or silver). By providing a method of preferential separation, mercury is prevented from contacting the activated carbon, resolving the worker health issues and environmental issues described above. Further by providing such a separation, the yield of metal product in the solution is maximized in subsequent processing steps.

Currently, there are a paucity of methods that are useful to preferentially reduce or remove mercury from ore leachates, such as gold and silver ore leachates and in particular gold ore leachates. Due to chemical similarities in particular between gold and mercury and additionally the known tendency of both gold and silver to form amalgams with mercury, substantial difficulties remain in recovering the valuable metal product. In the Merrill-Crowe process, evaporation of mercury from zinc prepitated gold remains an effective but extremely undesirable method of choice in many ore refining operations since this still leads to risk of mercury exposure and the mercury must be handled and disposed at great effort and expense.

SUMMARY

Disclosed herein is a method of making a treated ore leachate, the method comprising collecting an ore leachate, the ore leachate comprising a metal product and mercury; adding a precipitating agent to the ore leachate, the precipitating agent comprising a dithiocarbamate polymer, a dithiocarbamate compound, or a mixture thereof; adding a coagulant to the ore leachate to form a partitioned composition, the coagulant comprising an inorganic compound comprising $Fe^{3+}$, $Al^{3+}$, or a mixture thereof; and separating a mercury-laden precipitate from the partitioned composition to form the treated ore leachate. In some embodiments, the precipitating agent is a dithiocarbamate polymer comprising dithiocarbamate-functionalized polyethylene imine. In some embodiments, the coagulant is $Fe_2(SO_4)_3$. In some embodiments, the method further comprises adding a flocculant to the partitioned composition. In some embodiments, the method further comprises adding the precipitating agent and the coagulant contemporaneously. In some embodiments, the method further comprises adding the precipitating agent before adding the coagulant. In some embodiments, the precipitating agent is added to the ore leachate at about 1 ppm to 50 ppm per 2000 μg/l of mercury. In some embodiments, the ratio of precipitating agent to coagulant added is 5:1 to 1:5 by weight. In some embodiments, the treated ore leachate comprises 50% or less by weight of the mercury present in the ore leachate. In some embodiments, the treated ore leachate comprises 90% or more of the metal product present in the ore leachate. In some embodiments, the metal product is gold.

Also disclosed herein is a composition comprising a precipitating agent comprising a dithiocarbamate polymer, a thiocarbamate compound, or a mixture thereof; and a coagulant comprising an inorganic compound comprising $Fe^{3+}$, $Al^{3+}$, or a mixture thereof, wherein the weight ratio of precipitating agent:coagulant in the composition is about 5:1 to 1:5. In some embodiments, the composition is an aqueous composition. In some embodiments, the precipitating agent is a dithiocarbamate polymer comprising dithiocarbamate-functionalized polyethylene imine. In some embodiments, the coagulant is $Fe_2(SO_4)_3$. In some embodiments, the composition further comprises a flocculant. In some embodiments, the weight ratio of precipitating agent:coagulant in the composition is about 2:1 to 1:2. In some embodiments, wherein the precipitating agent is a blend of an alkyldithiocarbamate and a dithiocarbamate polymer.

Also disclosed herein is the use of any of the disclosed and/or claimed compositions recited above to selectively remove mercury from a gold ore leachate.

Additional advantages and novel features of the invention will be set forth in part in the description that follows, and in part will become apparent to those skilled in the art upon examination of the following, or may be learned through routine experimentation upon practice of the invention.

DETAILED DESCRIPTION

Although the present disclosure provides references to preferred embodiments, persons skilled in the art will recognize that changes may be made in form and detail without departing from the spirit and scope of the invention. Reference to various embodiments does not limit the scope of the claims attached hereto.

Definitions

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety and for all purposes. The materials, methods, and examples disclosed herein are illustrative only and not intended to be limiting.

As used herein, the term "mercury" means the transition metal having atomic number 80, any compound or complex derived therefrom, or a mixture of two or more thereof.

As used herein, the term "metal product" means gold, silver, copper, any compound or complex derived from any thereof, or a mixture of two or more thereof unless otherwise specified or determined by context.

As used herein, the term "ore leachate" means the liquid product obtained by contacting a metal product-bearing ore with a sodium cyanide (NaCN) solution at a pH of 9 or greater, and collecting the leachate thereof. The metal-bearing ore is obtained by one or more ore mining and producing processes well known in the art. The ore leachate has a pH of between about 9 and 12 and includes both a metal product and an amount of mercury dissolved therein. It will be understood by those of skill that not all ore leachates known contain mercury; however, the ore leachates as defined herein and addressed throughout are those that contain at least a measurable amount of mercury, which may be for example 1 ppb (part per billion), or even 1 ppt (part per trillion), depending on the measuring capability available.

As used herein, the term "gold ore leachate" means the ore leachate of a gold-bearing ore; such a leachate may also be referred to as a "cyanidation solution". The gold ore leachate has a pH of between about 9 and 12, often between about 10 and 11, and includes both gold and mercury dissolved therein.

As used herein, the term "treated ore leachate" or "treated leachate" means the liquid product obtained by contacting an ore leachate with at least a precipitating agent and a coagulant, followed by separating a mercury-laden precipitate therefrom. The contacting is carried out using one or more of the methods and compositions described below. The treated leachates include 50% to 0% by weight of the mercury present in the ore leachate and 90% to 100% by weight of the metal product present in the ore leachate. Wherein the ore leachate is a gold ore leachate, the treated ore leachate may be referred to as a "treated gold ore leachate" or "treated gold leachate."

As used herein, the term "precipitating agent" means a dithiocarbamate polymer, a thiocarbamate compound, a sulfide compound, or a blend of two or more thereof in any ratio, unless specifically limited by context.

As used herein, the term "dithiocarbamate polymer" means a compound characterized by having repeating chemical units, wherein about 5 mole % to 90 mole % of the repeating units include dithiocarbamate functionality.

As used herein, the term "thiocarbamate compound" means a compound characterized by having no repeating chemical units and comprising at least one dithiocarbamate or trithiocarbamate functionality.

As used herein, the term "sulfide compound" means a compound selected from hydrogen sulfide, calcium hydrogen sulfide, sodium hydrogen sulfide, trimercapto-S-triazine, silver sulfide, ferric sulfide, and water soluble trithiocarbonates; or a polymer selected from sulfur-functionalized polycarbonates, polystyrenes, or polyesters.

As used herein, the term "coagulant" means an inorganic compound including at least $Fe^{3+}$, $Al^{3+}$, or a combination thereof. In some embodiments the inorganic compound further comprises a counterion selected from sulfate ($SO_4^{2-}$), halide, halohydrates, or a combination thereof. In embodiments the coagulant is dissolved in an aqueous solution.

As used herein, the term "flocculant" means a polymer having about 10 mole % to 100 mole % repeating chemical units comprising carboxylic acid functionality, sulfonic acid functionality, or a mixture thereof substantially in conjugate base form. In some embodiments, the polymer further includes repeating chemical units derived from one or more of acrylamide, an, an acrylate ester, a phosphate functionalized compound, or a quaternary ammonium functionalized compound. In some embodiments, the flocculant polymer is characterized as having "high molecular weight", which means a weight-average molecular weight of at least about 1,000,000 g/mol.

The terms "comprise(s)," "include(s)," "having," "has," "can," "contain(s)," and variants thereof, as used herein, are intended to be open-ended transitional phrases, terms, or words that do not preclude the possibility of additional acts, components, or structures. The singular forms "a," "and" and "the" include plural references unless the context clearly dictates otherwise. The present disclosure also contemplates other embodiments "comprising," "consisting of" and "consisting essentially of" the embodiments or elements presented herein, whether explicitly set forth or not.

As used herein, the term "optional" or "optionally" means that the subsequently described event or circumstance may but need not occur, and that the description includes instances where the event or circumstance occurs and instances in which it does not.

As used herein, the term "about" modifying, for example, the quantity of an ingredient in a composition, concentration, volume, process temperature, process time, yield, flow rate, pressure, and like values, and ranges thereof, employed in describing the embodiments of the disclosure, refers to variation in the numerical quantity that can occur, for example, through typical measuring and handling procedures used for making compounds, compositions, concentrates or use formulations; through inadvertent error in these procedures; through differences in the manufacture, source, or purity of starting materials or ingredients used to carry out the methods, and like proximate considerations. The term "about" also encompasses amounts that differ due to aging of a formulation with a particular initial concentration or mixture, and amounts that differ due to mixing or processing a formulation with a particular initial concentration or mixture. Where modified by the term "about" the claims appended hereto include equivalents to these quantities. Further, where "about" is employed to describe a range of values, for example "about 1 to 5" the recitation means "1 to 5" and "about 1 to about 5" and "1 to about 5" and "about 1 to 5" unless specifically limited by context.

As used herein, the word "substantially" modifying, for example, the type or quantity of an ingredient in a composition, a property, a measurable quantity, a method, a position, a value, or a range, employed in describing the embodiments of the disclosure, refers to a variation that does not affect the overall recited composition, property, quantity, method, position, value, or range thereof in a manner that negates an intended composition, property, quantity, method, position, value, or range. Examples of intended properties include, solely by way of nonlimiting examples thereof, flexibility, partition coefficient, rate, solubility, temperature, and the like; intended values include thickness, yield, weight, concentration, and the like. The effect on methods that are modified by "substantially" include the effects caused by variations in type or amount of materials used in a process, variability in machine settings, the effects of ambient conditions on a process, and the like wherein the manner or degree of the effect does not negate one or more intended properties or results; and like proximate considerations. Where modified by the term "substantially" the claims appended hereto include equivalents to these types and amounts of materials.

Discussion

We have found that addition of a precipitating agent and a coagulant to an ore leachate results in preferential precipitation of mercury species, thereby enabling separation of mercury from the ore leachate to provide a treated ore leachate. A substantial amount of mercury species present in a ore leachate is removed therefrom using the methods and compositions described herein, while at the same time the amount of metal product remaining in the treated ore leachate is at least 90% of the amount in the ore leachate. While not limited thereto, these methods are particularly advantageous for use in conjunction with gold ore leachates, due to the high value of gold in the marketplace as well as the recognized problems associated with separation of gold from mercury.

Accordingly, described herein is a method of forming a treated ore leachate, the method comprising: adding a precipitating agent and a coagulant to an ore leachate, and separating a mercury-laden precipitate therefrom to provide the treated leachate. The treated leachate includes about 0 to about 50% by weight of the mercury present in the ore leachate. The treated leachate includes about 90% to about 100% by weight of the metal product present in the ore leachate. In embodiments, the method further includes adding a flocculant to the ore leachate prior to the separating.

A treating composition is also disclosed herein, the composition being useful to reduce the amount of mercury in an ore leachate without substantially reducing the amount of metal product therein. The composition comprises a precipitating agent and a coagulant. In some embodiments, the composition further comprises a flocculant.

A partitioned composition disclosed herein is formed upon adding the precipitating agent, coagulant, and in some embodiments also a flocculant to the ore leachate. Such compositions are partitioned to include a treated ore leachate solution phase and a precipitated phase enriched in mercury and substantially not enriched in the metal product. The relative size/volume of these two phases may change with time, specifically the period of time between the additions and the separation of mercury-laden precipitate from the partitioned composition to yield the treated ore leachate. In embodiments, the precipitated phase includes about 50% to about 100% by weight of the mercury present in the ore leachate prior to forming the composition, and about 0% to about 10% of the metal product present in the ore leachate prior to forming the composition.

The precipitating agent is a water soluble or water dispersible dithiocarbamate polymer, thiocarbamate compound, or sulfide compound. Useful dithiocarbamate polymers include any of those described in U.S. Pat. No. 5,164,095 or 8,211,389, which are incorporated by reference herein in their entirety and for all purposes. In some embodiments, the dithiocarbamate polymer is a polyethylene imine polymer or copolymer wherein a portion of the amine groups are functionalized with dithiocarbamate. Such polymers are known in the art and have weight average molecular weights ranging from about 500 g/mol up to about 500,000 g/mol. In other embodiments, the dithiocarbamate polymer is an acrylamide polymer or copolymer wherein a portion of the acrylamide groups are functionalized with dithiocarbamate. Such polymers comprise between 5 mole % and 100 mole % dithiocarbamate functionalized repeat units, wherein 1 mole percent in this context means one percent of the total number of repeat units present in the polymer. In some embodiments, a dithiocarbamate polymer includes about 20 mole % to 90 mole %, or about 30 mole % to 90 mole %, or about 40 mole % to 90 mole %, or about 50 mole % to 90 mole %, or about 60 mole % to 90 mole %, or about 70 mole % to 90 mole %, or about 10 mole % to 80 mole %, or about 10 mole % to 70 mole %, or about 10 mole % to 60 mole %, or about 10 mole % to 50 mole %, or about 10 mole % to 40 mole %, or about 10 mole % to 30 mole %, or about 40 mole % to 80 mole %, or about 50 mole % to 70 mole % repeat units having dithiocarbamate functionality.

Dithiocarbamate polymers formed by functionalizing polyethylene imine polymers with dithiocarbamate are well known in the art and are sold, for example, by the Nalco Company of Naperville, Ill. under the trade name NAL-MET®. These polymers have been widely used in the power generation industry to effectively remove mercury from gas scrubbers and waste streams as well as removing other metals from mining and industrial processes. However, the high cyanide concentrations and high pH present in the ore leachates are outside the normal operating parameters of these polymers. These polymers are known to precipitate mercury from solutions—e.g. wastewater, etc. at basic, neutral or acidic pH; however, product literature for these products discourages use in solutions having pH of 9 to 12. Such polymers are provided in dry powder or granular form, emulsion/latex form or in solutions containing about 5 wt % to 50 wt % of the polymer in water, typically at pH above 7. It is reported in the product literature that these polymers become unstable in solutions having a pH of less than about 4.5.

Thiocarbamate compounds include dithiocarbamate compounds. Dithiocarbamate compounds have the chemical formula

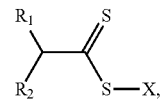

wherein $R_1$ and $R_2$ are independently $C_1$-$C_4$ alkyl, branched alkyl or alkenyl and X is sodium or potassium. In some embodiments, $R_1$ and $R_2$ are ethyl or methyl. In some embodiments, both $R_1$ and $R_2$ are methyl. In some embodiments, X is potassium. In some embodiments, the dithiocarbamate compound is dimethyldithiocarbamate. The dithiocarbamate compounds are known to precipitate mercury from solutions containing $Hg(CN)_4^{-2}$, $Hg(CN)_3^{-1}$ and $Hg(CN)_2^{0}$ species, as taught in U.S. Pat. No. 5,599,515 which is incorporated herein by reference in its entirety and for all purposes.

Useful sulfide compounds include water soluble trithiocarbonates. Water soluble trithiocarbonates include alkali metal, alkaline earth metal, ammonium, alkylammonium or hydroxyalkylammonium trithiocarbonates and hydrates thereof, as well as any blend of these. Sodium trithiocarbonate is available commercially in a concentrated aqueous solution, and there are several methods available to the skilled artisan for the synthesis of sodium trithiocarbonate and other water soluble trithiocarbonates.

In some embodiments, the precipitating agent is a combination of two or more dithiocarbamate polymers, thiocarbamate compounds, and/or sulfide compounds. In some embodiments, the precipitating agent is a combination of two or more dithiocarbamate polymers. In some embodiments, the precipitating agent is a combination of two or more thiocarbamate compounds. In some embodiments, the precipitating agent is a combination of one or more dithiocarbamate polymers and one or more thiocarbamate compounds. In some embodiments, the precipitating agent is a combination of one or more dithiocarbamate polymers and one or more dithiocarbamate compounds. In some embodiments, the precipitating agent is a combination of one or more dithiocarbamate polymers and one or more sulfide compounds.

The coagulant is an ionic compound containing $Fe^{3+}$, $Al^{3+}$, or a combination thereof and a counterion that is not particularly limited, but in embodiments is selected from sulfate ($SO_4^{2-}$), halides, and halohydrates. In embodiments, the coagulant is $Fe_2(SO_4)_3$. In some embodiments, the coagulant is $Al_2(SO_4)_3$. In some embodiments, the coagulant is $FeCl_3$, $AlCl_3$, aluminium chlorohydrate (ACH), or polyaluminium chloride (PAC). In some embodiments the coagulant is a blend of two or more of the above listed compounds.

The flocculant is a neutralized or partially neutralized polymer comprising about 10 mole % to 100 mole % of repeat units attributable to acrylic acid or a sulfonic acid functional monomer such as 2-acrylamido-2-methylpropane sulfonic acid. Suitable counterions associated with the neutralized or partially neutralized flocculant polymer include sodium and potassium as well as ammonium or an alkylammonium. In embodiments, the balance of the repeat units of the flocculant polymer are derived from a nonionic monomer, such as acrylamide. In some embodiments, the flocculant consists essentially of repeat units derived from acrylic acid and acrylamide; in some such embodiments the weight ratio of acrylic acid:acrylamide content is between 10:90 and 90:10, such as about 20:80, 30:70, 40:60, 50:50, 60:40, 70:30, 80:20, and the like. In some embodiments the flocculant polymer is a high molecular weight polymer, that is, the flocculant polymer has a weight-average molecular weight of about 1 million g/mol or greater. In some embodiments the flocculant is provided as a solid, e.g. a powder or granule form. In other embodiments the flocculant is provided as a latex, dispersion, or solution including about 10 wt % to 90 wt % of the flocculant polymer. Suitable flocculants include Nalco 9601 PULV, sold by the Nalco Company of Naperville, Ill.

A method of forming a treated ore leachate comprises or consists essentially of adding a precipitating agent and a coagulant to an ore leachate, and separating a mercury-laden precipitate therefrom to provide the treated leachate. In some embodiments, the method further includes adding a flocculant to the ore leachate prior to the separating. The additions of precipitating agent, coagulant, and flocculant are accomplished contemporaneously in some embodiments, whereas in other embodiments the adding is carried out sequentially. In some embodiments where adding is carried out sequentially the adding is accomplished in the following order: adding precipitating agent; adding coagulant; and optionally adding flocculant. In other embodiments where the adding is carried out sequentially the adding is accomplished in the following order: adding coagulant; adding precipitating agent; and optionally adding flocculant. Where the additions are carried out sequentially, each addition is followed by a period of about 1 second to 10 hours, or about 10 seconds to 5 hours, or about 30 seconds to 2 hours, or about 1 minute to 1 hour prior to the subsequent addition. After all additions are complete, the mercury laden precipitate is separated from the treated ore leachate. Separating is accomplished by sedimentation/decanting, filtration, flotation, or any other continuous or batchwise method known to those of skill in the art of processing ore leachates.

The amount of precipitating agent added to the ore leachate is determined by the amount of mercury present in the ore leachate. Where blends of two or more precipitating agents are employed, the amounts recited herein reflect the total amount of precipitating agent. In some embodiments, to treat an ore leachate including about 2000 μl/l of mercury, about 1 ppm to 50 ppm of the precipitating agent is added to the ore leachate on a weight basis, for example about 2 ppm to 50 ppm, or about 3 ppm to 50 ppm, or about 4 ppm to 50 ppm, or about 5 ppm to 50 ppm, or about 6 ppm to 50 ppm, or about 7 ppm to 50 ppm, or about 8 ppm to 50 ppm, or about 9 ppm to 50 ppm, or about 10 ppm to 50 ppm, or about 12 ppm to 50 ppm, or about 15 ppm to 50 ppm, or about 20 ppm to 50 ppm, or about 5 ppm to 40 ppm, or about 5 ppm to 30 ppm, or about 5 ppm to 20 ppm of the precipitating agent is added to the ore leachate on a weight basis. Where the precipitating agent comprises or consists essentially of a dithiocarbamate polymer, the amount of precipitating agent suitably added is further optimized by the mole percent dithiocarbamate functionality of the polymer.

In some cases, it may be determined that heavy metals are present in the ore leachate solution, such as copper, which compete with mercury for e.g. thiocarbamate moieties. In such cases, an additional amount of the precipitating agent may be added to exhaust the competing metal ions.

The amount of coagulant is determined by the amount of precipitation agent added. Where blends of two or more coagulants are employed, the amounts recited herein reflect the total amount of coagulant. The coagulant is added in an amount by weight corresponding to a weight:weight ratio of precipitation agent:coagulant of about 5:1 to 1:5, for example about 4:1 to 1:5, or about 3:1 to 1:5, or about 2:1 to 1:5, or about 1:1 to 1:5, or about 1:2 to 1:5, or about 1:3 to 1:5, or about 1:4 to 1:5, or about 5:1 to 1:4, or about 5:1 to 1:3, or about 5:1 to 1:2, or about 5:1 to 1:1, or about 5:1 to 2:1, or about 5:1 to 3:1, or about 5:1 to 4:1.

Where a flocculant is employed, the amount of flocculant added to the ore leachate is generally about 0.1 ppm to 25 ppm based on the weight of the ore leachate, but in some cases is up to about 1 weight % based on the weight of the ore leachate. The flocculant or a blend of two or more thereof may be suitably employed in an amount corresponding to the manufacturer's directions in some embodiments. In embodiments, about 0.5 ppm to 25 ppm of flocculant is added to an ore leachate, or about 1 ppm to 25 ppm, or about 2 ppm to 25 ppm, or about 0.1 ppm to 20 ppm, or about 0.1 ppm to 15 ppm, or about 0.1 ppm to 10 ppm, or about 0.1 ppm to 5 ppm, or about 0.5 ppm to 10 ppm, or about 0.5 ppm to 5 ppm, or about 1 ppm to 10 ppm, or about 1 ppm to 5 ppm. The flocculant may be provided dry, as a powder or granule form, or may be provided in a solution, latex, or dispersion having about 10 wt % to 70 wt % polymer dissolved or dispersed therein.

Since the amount of coagulant added to the ore leachate is determined by the amount of precipitation agent required, it is possible to provide a mercury removing composition comprising a precipitating agent plus a coagulant, where the weight ratio of precipitating agent:coagulant is 5:1 to 1:5, for example about 4:1 to 1:5, or about 3:1 to 1:5, or about 2:1 to 1:5, or about 1:1 to 1:5, or about 1:2 to 1:5, or about 1:3 to 1:5, or about 1:4 to 1:5, or about 5:1 to 1:4, or about 5:1 to 1:3, or about 5:1 to 1:2, or about 5:1 to 1:1, or about 5:1 to 2:1, or about 5:1 to 3:1, or about 5:1 to 4:1. The composition can be added to the ore leachate in a single addition or in aliquots, depending on the equipment and operators in a particular location. In some embodiments the mercury removing composition further comprises an amount of flocculant. In some embodiments the mercury removing composition is provided in an aqueous solution, optionally comprising one or more additional components or agents such as cosolvents, preservatives, etc. Aqueous mercury removing compositions are suitably provided wherein the solution components are provided in the same ratios as described above, but the composition is further deliverable in an aqueous solution or dispersion having about 5 wt % to 50 wt % solid "actives" wherein actives include the precipitating agent, the coagulating agent, and optionally a flocculant dispersed or dissolved therein.

After adding the precipitating agent and the coagulating agent, and in some embodiments also adding the flocculant, a precipitate is observed to form in the ore leachate. The precipitate is a mercury-laden precipitate that is separated from the treated ore leachate. Mercury-laden precipitates are suitably separated from partitioned compositions by filtration, centrifugation, flotation, settling, or a combination thereof. Flotation is easily accomplished in some embodiments using a minimum amount of frother such as a dithiophosphate and injecting air into the partitioned composition. In some embodiments, the mercury-laden precipitates are sufficiently stable to be disposed in a conventional manner without causing toxicological or environmental issues such as those associated with vapor phase mercury. In some embodiments, mercury-laden precipitates contain a measurable amount of metal product; in such embodiments, the mercury-laden precipitate may be further processed to recapture the metal product.

After separating the mercury-laden precipitate from the partitioned composition, a treated leachate is obtained. The treated leachate includes about 0 to about 50% by weight of the mercury present in the ore leachate, for example about 0% to 45%, or about 0% to 40%, or about 0% to 35%, or about 0% to 30%, or about 0% to 25%, or about 0% to 20%, or about 0% to 15%, or about 0% to 10%, or about 0% to 5%, or about 0% to 4%, or about 0% to 3%, or about 0% to 2%, or about 0% to 1%, or about 1% to 50%, or about 2% to 50%, or about 3% to 50%, or about 4% to 50%, or about 5% to 50%, or about 10% to 50%, or about 20% to 50%, or about 30% to 50%, or about 40% to 50% by weight of the mercury present in the ore leachate. The treated leachate includes about 90% to about 100% by weight of the metal product present in the ore leachate, for example about 91% to 100%, or about 92% to 100%, or about 93% to 100%, or about 94% to 100%, or about 95% to 100%, or about 96% to 100%, or about 97% to 100%, or about 98% to 100%, or about 99% to 100%, or about 99.5% to 100%, or about 99.9% to 100% by weight of the metal product present in the ore leachate.

The treated ore leachate is then processed in subsequent processing steps conventionally accomplished to complete the collection of metal product from an ore leachate. In the case of gold ore leachate, a conventional subsequent step is contacting the leachate with activated carbon. In such embodiments, an activated carbon contacted with a treated leachate adsorbs significantly less mercury compared to the activated carbon contacted with the ore leachate.

The following Examples are not intended to be limiting and merely set forth some of the many possible embodiments for the appended claims.

EXAMPLES

A sample of gold ore leachate (cyanidation solution) was obtained from a heap leach pile. Jars (about 1 liter volume) were charged with 500 ml aliquots of the leachate. A multi-paddle stirrer was used to mix reagents into the aliquots. The following reagents were added:

Precipitating Agent:

10 wt % solution of a water soluble ethylene dichloride ammonia polymer having a weight-average molecular weight of about 5000 g/mol and about 50 mole % of dithiocarbamate salt groups.

Coagulating Agent:

$Fe_2(SO_4)_3$, 40% aq

Flocculant:

Nalco 9601 PULV, obtained from the Nalco Company of Naperville, Ill., diluted in water to 0.05 wt % solids.

Additions were made to the 500 ml aliquots by adding reagents in the following order, where applicable: precipitating agent, coagulating agent, flocculant. All reagents were added while mixing the aliquot for one minute with the stirrer speed set to 100% (maximum speed). Then stirring was continued for two additional minutes at 20% speed. Then the stirrer was stopped and the aliquots were allowed to stand undisturbed for two minutes. Precipitates that formed were then separated from the aliquot by sedimentation. The resulting treated leachates were collected and analyzed for Hg and Au using ICP-OES or AAS. The ore leachate as received was also analyzed. Results of the analyses are shown in Table 1, together with amounts of precipitating agent, coagulating agent, and flocculant added.

TABLE 1

Reagents added to the ore leachate aliquots, as ppm of the active compound in the reagents listed above, and amounts of Au and Hg measured.

| Reagent | Actives, ppm | Au, µg/liter | Hg, µg/liter |
| --- | --- | --- | --- |
| None (control) | 0 | 481 | 1800 |
| Precipitating agent | 6 | 456 | 1300 |
| Precipitating agent | 11 | 255 | 1700 |
| Precipitating agent | 6 | 472 | 250 |
| Coagulant | 4 | | |
| Flocculant | 2.4 | | |

The invention illustratively disclosed herein can be suitably practiced in the absence of any element which is not specifically disclosed herein. Additionally each and every embodiment of the invention, as described herein, is intended to be used either alone or in combination with any other embodiment described herein as well as modifications, equivalents, and alternatives thereof. In various embodiments, the invention suitably comprises, consists essentially of, or consists of the elements described herein and claimed according to the claims. It will be recognized that various modifications and changes may be made without following the example embodiments and applications illustrated and described herein, and without departing from the scope of the claims.

What we claim is:

1. A method of making a treated gold ore leachate, the method comprising contacting a gold-bearing ore with a sodium cyanide solution at a pH of 9 or greater to form a gold ore leachate, the gold ore leachate comprising gold and mercury;

adding a precipitating agent and a coagulant to the gold ore leachate to form a partitioned composition, the precipitating agent comprising a dithiocarbamate polymer that is a water-soluble ethylene dichloride ammonia polymer having a weight-average molecular weight of about 5000 g/mol and about 50 mole % dithiocarbamate salt groups, the coagulant consisting essentially of $Fe_2(SO_4)_3$; and separating a mercury-laden precipitate from the partitioned composition to form the treated ore leachate, the mercury-laden precipitate comprising about 50% to about 100% by weight of the mercury and about 0% to about 10% of the gold present in the gold ore leachate.

2. The method of claim 1 wherein the method further comprises adding a flocculant to the partitioned composition.

3. The method of claim 1 comprising adding the precipitating agent and the coagulant contemporaneously.

4. The method of claim 1 comprising adding the precipitating agent before adding the coagulant.

5. The method of claim 1 wherein the ratio of precipitating agent to coagulant added is 5:1 to 1:5 by weight.

6. The method of claim 1 comprising adding the precipitating agent to the gold ore leachate at about 1 ppm to 50 ppm per 2000 µg/l of mercury.

7. A composition consisting essentially of
   a gold ore leachate formed by contacting a gold-bearing ore with a sodium cyanide solution at a pH of 9 or greater;
   a precipitating agent that is a water-soluble ethylene dichloride ammonia polymer having a weight-average molecular weight of about 5000 g/mol and about 50 mole % dithiocarbamate salt groups;
   a coagulant that is $Fe_2(SO_4)_3$;
   optionally a flocculant; and
   optionally a trithiocarbonate,
   wherein the weight ratio of precipitating agent:coagulant in the composition is about 5:1 to 1:5.

8. The composition of claim 7 wherein the flocculant is a neutralized or partially neutralized polymer comprising about 10 mole % to 100 mole % of repeat units attributable to acrylic acid or a sulfonic acid functional monomer.

9. The composition of claim 7 wherein the trithiocarbonate is water soluble and comprises alkali metal, alkaline earth metal, ammonium, alkylammonium, or hydroxyalkylammonium.

* * * * *